US012764774B2

(12) United States Patent
Abedini et al.

(10) Patent No.: US 12,764,774 B2
(45) Date of Patent: Oct. 13, 2026

(54) TIME DIVISION DUPLEXING DOWNLINK-UPLINK CONFIGURATION SIGNALING

(71) Applicant: QUALCOMM Incorporated, San Diego, CA (US)

(72) Inventors: Navid Abedini, Basking Ridge, NJ (US); Xipeng Zhu, San Diego, CA (US); Tao Luo, San Diego, CA (US); Luca Blessent, Whitehouse Station, NJ (US); Karl Georg Hampel, Jersey City, NJ (US); Jianghong Luo, Skillman, NJ (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/762,782

(22) Filed: Jul. 3, 2024

(65) Prior Publication Data

US 2024/0357629 A1 Oct. 24, 2024

Related U.S. Application Data

(63) Continuation of application No. 17/228,065, filed on Apr. 12, 2021, now Pat. No. 12,232,155.

(Continued)

(51) Int. Cl.

*H04W 72/541* (2023.01)
*H04L 5/00* (2006.01)

(Continued)

(52) U.S. Cl.

CPC ......... *H04W 72/541* (2023.01); *H04L 5/1469* (2013.01); *H04W 72/0446* (2013.01); *H04W 72/53* (2023.01)

(58) Field of Classification Search

CPC ............... H04W 72/541; H04W 72/53; H04W 72/0446; H04L 5/1469

(Continued)

(56) References Cited

U.S. PATENT DOCUMENTS

| | | | | |
|---|---|---|---|---|
| 2019/0349079 | A1* | 11/2019 | Novlan | H04B 7/15542 |
| 2020/0145993 | A1 | 5/2020 | Abedini et al. | |

(Continued)

FOREIGN PATENT DOCUMENTS

| | | | |
|---|---|---|---|
| CN | 111066363 | A | 4/2020 |
| EP | 4044710 | A1 | 8/2022 |
| WO | 2020033732 | A1 | 2/2020 |

OTHER PUBLICATIONS

Guo Z., et al., "On the Cross Link Interference of 5G with Flexible Duplex and Full Duplex", 2020 IEEE Wireless Communications and Networking Conference Workshops (WCNCW), IEEE, Apr. 6, 2020 (Apr. 6, 2020), 4 pages, XP033784501, DOI: 10.1109/WCNCW48565.2020.9124866, [Retrieved on Jun. 24, 2020], paragraph [0003], the whole document.

(Continued)

*Primary Examiner* — Xuan Lu
(74) *Attorney, Agent, or Firm* — Harrity & Harrity LLP

(57) ABSTRACT

Various aspects of the present disclosure generally relate to wireless communication. In some aspects, a first wireless node may transmit, to a second wireless node, a cross-link interference (CLI) management configuration message including a permutation indicator, wherein the permutation indicator indicates that an order of slot formats is an uplink-flexible-downlink order of slot formats or indicates that the order of slot formats is a downlink-flexible-uplink order of slot formats; and communicate with one or more third (Continued)

wireless nodes in accordance with the order of slot formats indicated to the second wireless node. Numerous other aspects are provided.

20 Claims, 7 Drawing Sheets

Related U.S. Application Data

(60) Provisional application No. 63/024,219, filed on May 13, 2020.

(51) Int. Cl.
*H04L 5/14* (2006.01)
*H04W 72/0446* (2023.01)
*H04W 72/27* (2023.01)
*H04W 72/53* (2023.01)

(58) Field of Classification Search
USPC .......................................................... 370/329
See application file for complete search history.

(56) References Cited

U.S. PATENT DOCUMENTS

| | | | |
|---|---|---|---|
| 2020/0145994 A1 | 5/2020 | Luo et al. | |
| 2020/0145997 A1 | 5/2020 | Luo et al. | |
| 2020/0389805 A1 | 12/2020 | Kim et al. | |
| 2021/0298000 A1 | 9/2021 | Park et al. | |
| 2021/0298026 A1 | 9/2021 | Abotabl et al. | |
| 2021/0360641 A1 | 11/2021 | Abedini et al. | |
| 2022/0095240 A1 | 3/2022 | Ying et al. | |
| 2022/0095283 A1 | 3/2022 | Wei et al. | |
| 2022/0110136 A1 | 4/2022 | Li et al. | |
| 2022/0201524 A1 | 6/2022 | Ying et al. | |
| 2022/0248399 A1 | 8/2022 | You et al. | |
| 2022/0272699 A1* | 8/2022 | Zhuo | H04L 1/1614 |
| 2022/0279532 A1* | 9/2022 | Barac | H04W 72/27 |

OTHER PUBLICATIONS

International Search Report and Written Opinion—PCT/US2021/070380—ISA/EPO—Jun. 22, 2021.

* cited by examiner

TIME DIVISION DUPLEXING DOWNLINK-UPLINK CONFIGURATION SIGNALING

CROSS-REFERENCE TO RELATED APPLICATIONS

This application is a continuation of U.S. patent application Ser. No. 17/228,065, filed Apr. 12, 2021, which claims priority to U.S. Provisional Patent Application No. 63/024,219, filed on May 13, 2020, entitled "TIME DIVISION DUPLEXING DOWNLINK-UPLINK CONFIGURATION SIGNALING," and assigned to the assignee hereof. The contents of each of the above-referenced applications are incorporated herein by reference in their entireties.

FIELD OF THE DISCLOSURE

Aspects of the present disclosure generally relate to wireless communication and to techniques and apparatuses for time division duplexing (TDD) downlink-uplink configuration signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first wireless node, may include transmitting, to a second wireless node, a cross-link interference (CLI) management configuration message including a permutation indicator, wherein the permutation indicator indicates that an order of slot formats is an uplink-flexible-downlink order of slot formats or indicates that the order of slot formats is a downlink-flexible-uplink order of slot formats; and communicating with one or more third wireless nodes in accordance with the order of slot formats indicated to the second wireless node.

In some aspects, a first wireless node for wireless communication may include memory and one or more processors coupled to the memory. The memory and the one or more processors may be configured to transmit, to a second wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and communicate with one or more third wireless nodes in accordance with the order of slot formats indicated to the second wireless node.

In some aspects, a non-transitory computer-readable medium may store one or more instructions for wireless communication. The one or more instructions, when executed by one or more processors of a first wireless node, may cause the one or more processors to transmit, to a second wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and communicate with one or more third wireless nodes in accordance with the order of slot formats indicated to the second wireless node.

In some aspects, an apparatus for wireless communication may include means for transmitting, to a second wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and means for communicating with one or more third wireless nodes in accordance with the order of slot formats indicated to the second wireless node.

In some aspects, a method of wireless communication, performed by a second wireless node, may include receiving, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and communicating with one or more third wireless nodes in accordance with the order of slot formats received from the first wireless node.

In some aspects, a second wireless node for wireless communication may include memory and one or more processors coupled to the memory. The memory and the one or more processors may be configured to receive, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and communicate with one or more third wireless nodes in accordance with the order of slot formats received from the first wireless node.

In some aspects, a non-transitory computer-readable medium may store one or more instructions for wireless communication. The one or more instructions, when executed by one or more processors of a second wireless node, may cause the one or more processors to receive, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; and communicate with one or more third wireless nodes in accordance with the order of slot formats received from the first wireless node.

In some aspects, an apparatus for wireless communication may include means for receiving, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats; means for communicating with one or more third wireless nodes in accordance with the order of slot formats received from the first wireless node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer(s), processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
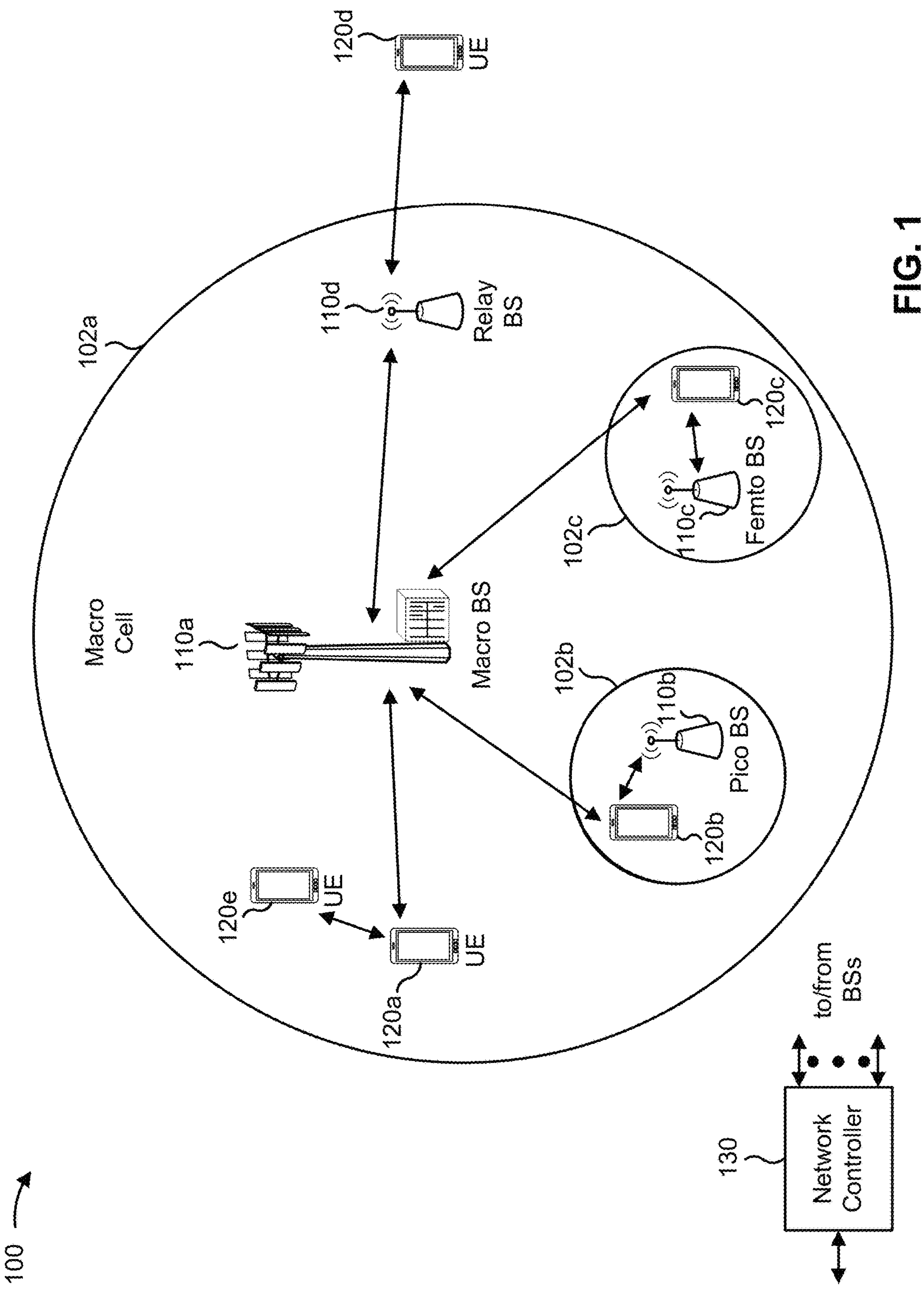
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
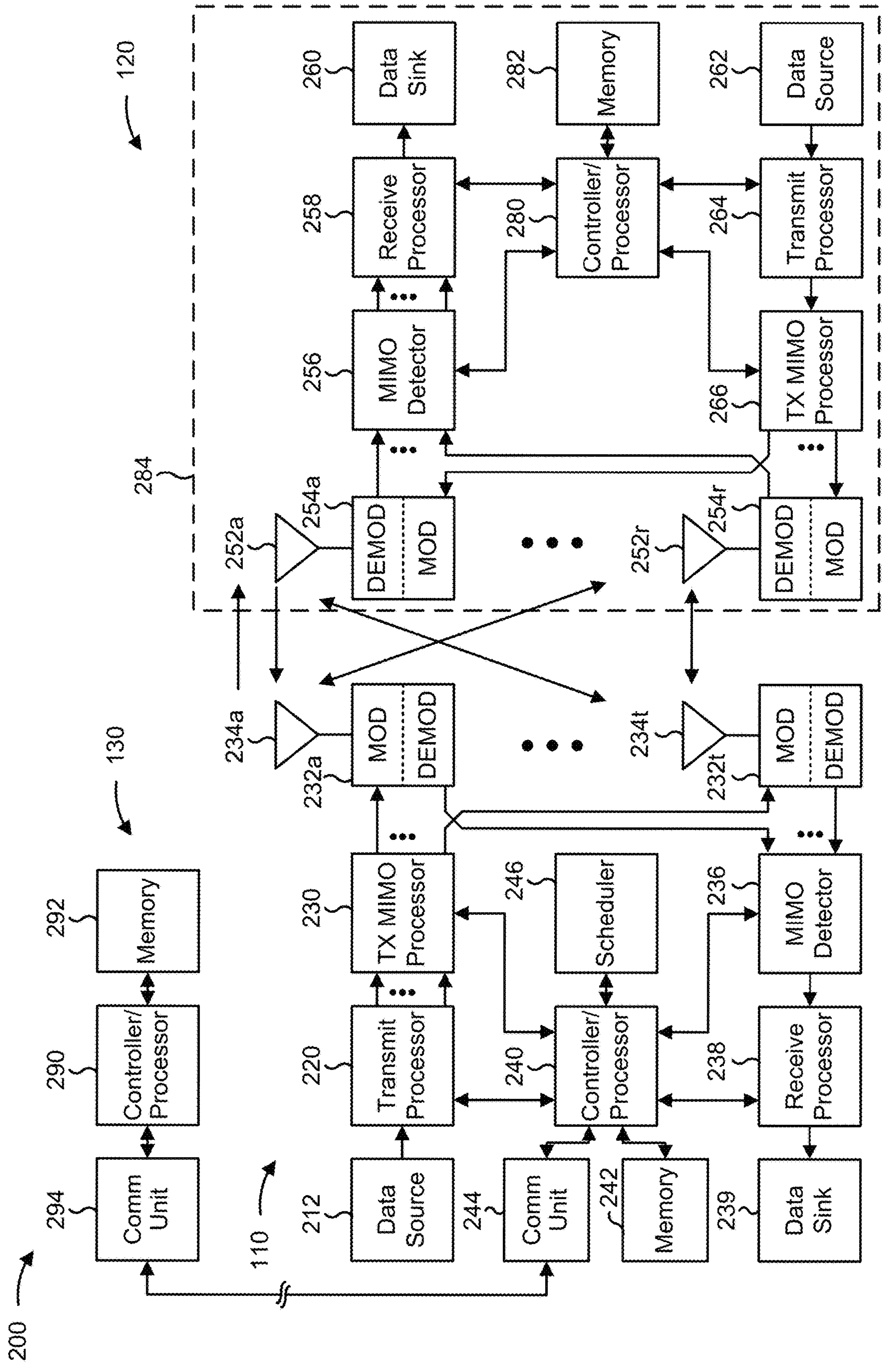
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with time division duplexing (TDD) downlink-uplink configuration signaling, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a first wireless node (e.g., BS 110, and/or UE 120,) may include means for transmitting, to a second wireless node, a cross-link interference (CLI) management configuration message including a permutation indicator, wherein the permutation indicator indicates that an order of slot formats is an uplink-flexible-downlink order of slot formats or indicates that the order of slot formats is a downlink-flexible-uplink order of slot formats, means for communicating with one or more third wireless nodes in accordance with the order of slot formats indicated to the second wireless node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

In some aspects, a second wireless node (e.g., BS 110, and/or UE 120) may include means for receiving, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats, means for communicating with one or more third wireless nodes in accordance with the order of slot formats received from the first wireless node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
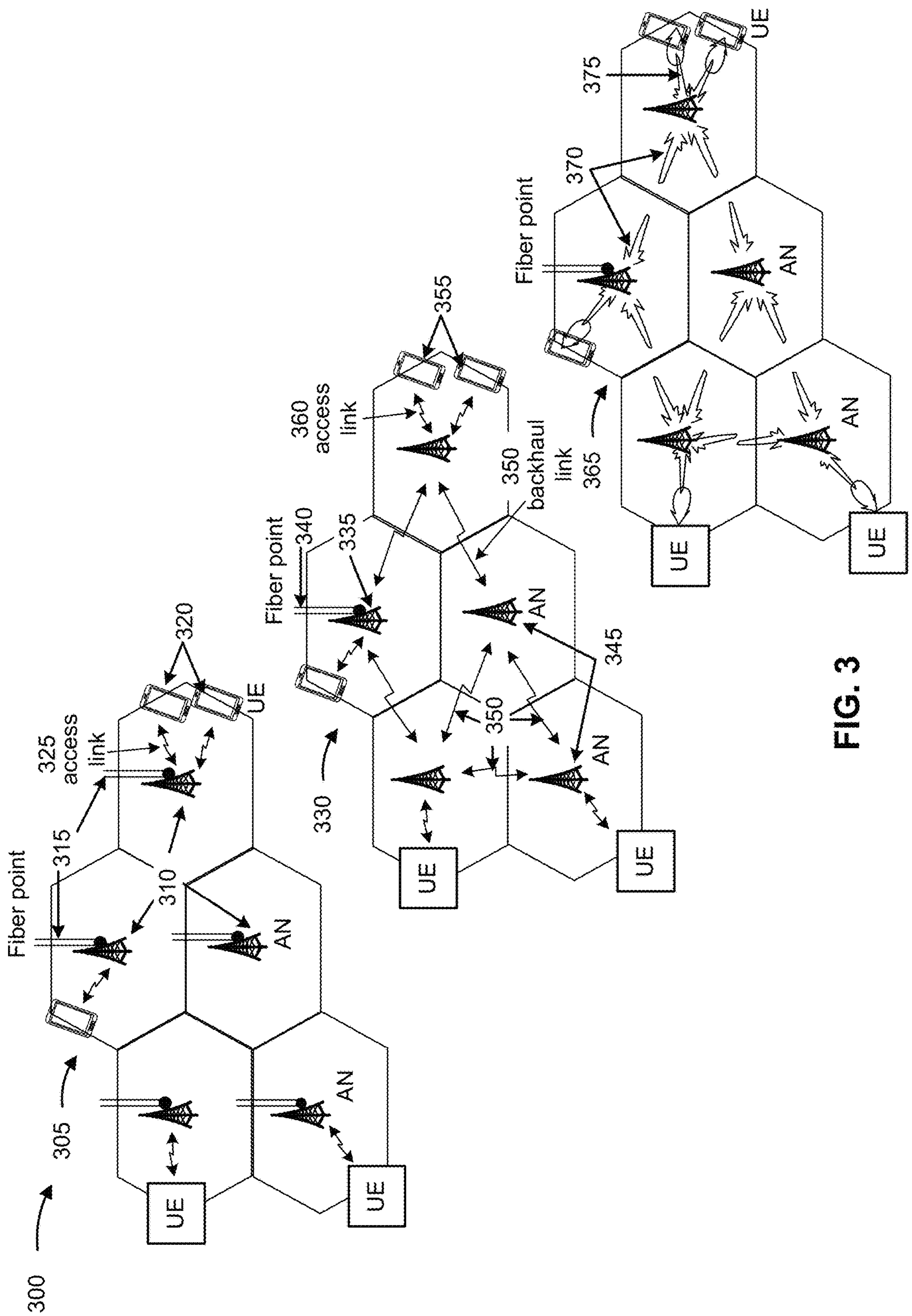
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, and/or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in 3 may be a base station 110 shown in FIG. 1. In some aspects, a UE 320 shown in 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming, among other examples. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in 3 may be replaced by one or more UEs that communicate via a UE-to-UE access network (e.g., a peer-to-peer network, and/or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
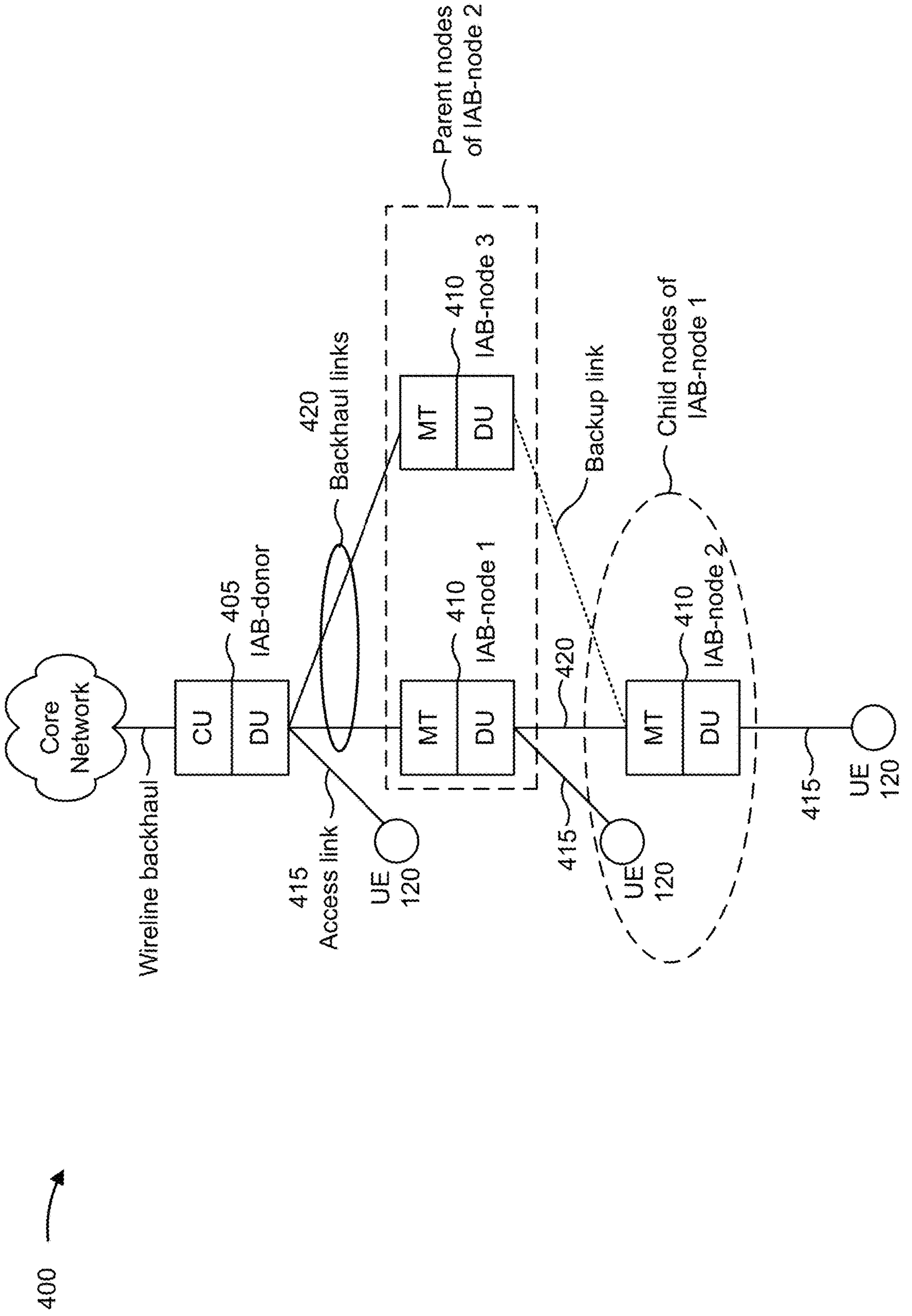
FIG. 4 is a diagram illustrating an example of an integrated access and backhauling (IAB) network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, and/or AMF functions, among other examples. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, and/or an F1 application protocol (F1AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Some communications systems may include cross-link interference (CLI) mitigation techniques. For example, on an F1-application protocol (F1-AP) interface between a DU and a CU, the DU may provide an intended time division duplexing (TDD) configuration of one or more cells of the DU. The DU may provide the intended TDD configuration to the CU via an F1 setup message, and/or a gNB-DU configuration update message, among other examples. Similarly, the CU may provide information identifying a TDD configuration of one or more neighboring cells of the CU. The CU may provide the intended TDD configuration to the DU via a gNB-CU configuration update message. An intended TDD configuration (e.g., an intended TDD downlink (DL)-uplink (UL) configuration) may use a message format associated with a TDD dedicated configuration message. The CU may communicate with other CUs over an Xn interface to exchange information related to the intended TDD configuration.

However, some slot formats, which may be used by cells neighboring a CU or cells of a DU, are not compatible with intended TDD configuration signaling. For example, a format of an intended TDD configuration message may not allow indication of slot formats of a format:

[$N_1$ UL symbols, $N_2$ flexible (F) symbols, $N_3$ DL symbols] where $N_1$, $N_2$, and $N_3$ are positive integers and where $N_1$, $N_2$, and $N_2$ are quantities of symbols in an ordered set of symbols. In other words, an intended TDD configuration message may not enable indication of a slot format that includes a first quantity of uplink symbols, followed by a second quantity of flexible symbols, followed by a third quantity of downlink symbols.

Moreover, some other types of slot formats may not be supported in an intended TDD configuration message, such as when $N_1>0$, $N_2=0$, and $N_3>0$; when $N_1>0$, $N_2>0$, and $N_3=0$; and/or when $N_1=0$, $N_2>0$, and $N_3>0$; among other examples. Some slot formats which cannot be indicated using an intended TDD configuration message may be indicatable using a TDD dedicated configuration message or a slot format indicator. However, using a slot format indicator or a TDD dedicated configuration message may not enable dynamic configuration to reduce CLI.

Moreover, the intended TDD configuration message may not support other indications that may be used to reduce CLI, such as indications identifying whether resources are available or not available, indications of other types of slot formats (e.g., slot formats of full-duplex symbols or bidirectional symbols), and/or indications on a per-transmit receive point (TRP) basis, among other examples. Thus, some aspects described herein provide enhancements for intended TDD configuration messages. For example, some aspects described herein provide additional information elements (IEs) in an intended TDD configuration message to identify the aforementioned slot formats, and/or indicate whether resources are available, indicate additional symbol types in some slot formats, among other examples.

In this way, wireless nodes, such as a CU or a DU, may communicate intended TDD configuration messages to reduce CLI relative to intended TDD configuration messages that do not have IEs described herein. Moreover, the wireless nodes may provide per-TRP configuration information in the TDD configuration messages, thereby enabling different TDD configurations for different TRPs associated with a cell. In this way, the wireless nodes enable improved flexibility in configuring TRPs associated with a cell, thereby improving a utilization of network resources.

Figure 5:
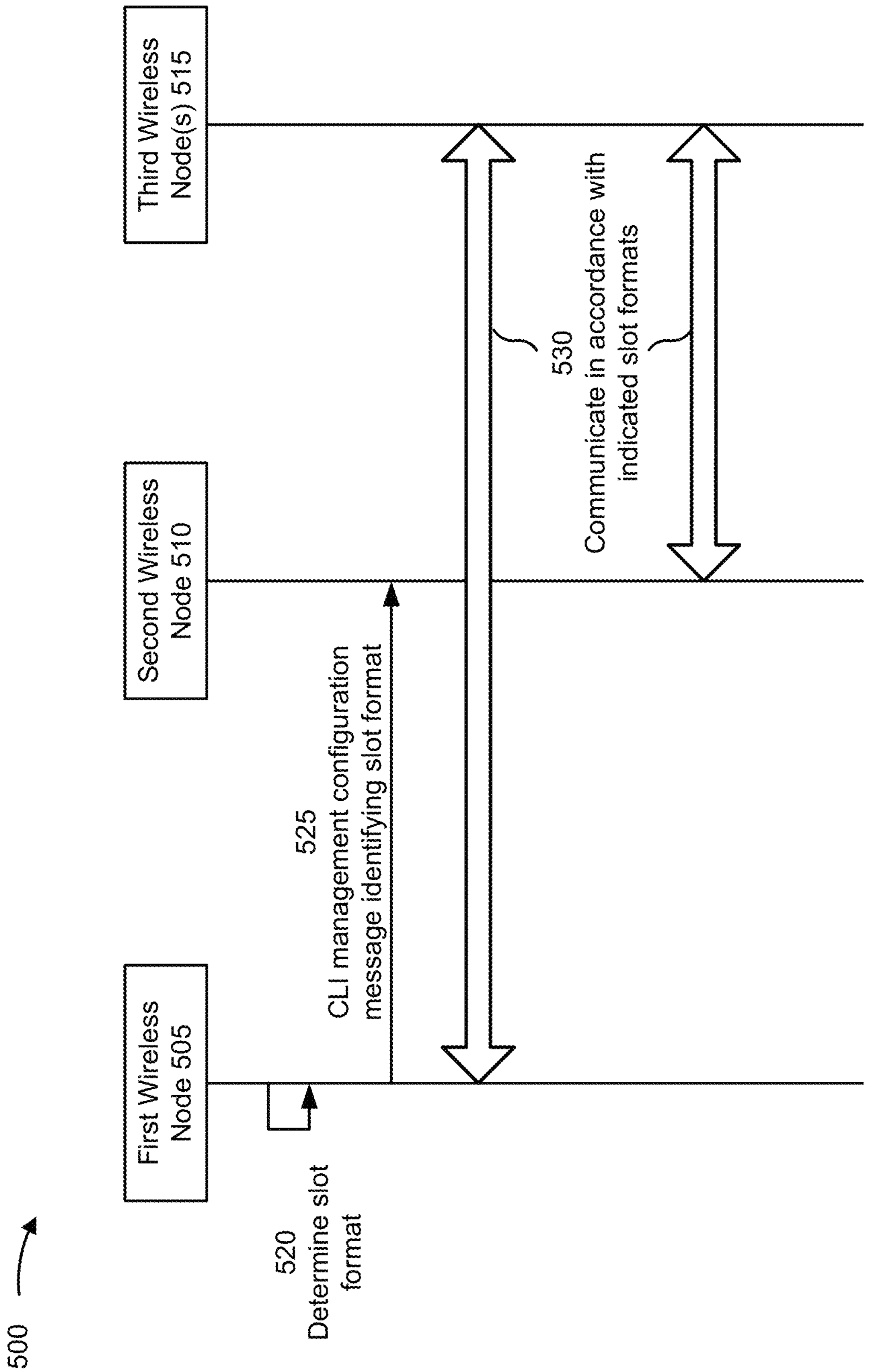
FIG. 5 is a diagram illustrating an example of time division duplexing (TDD) downlink-uplink configuration signaling, in accordance with the present disclosure.

FIG. 5 is a diagram illustrating an example 500 of TDD DL-UL configuration signaling, in accordance with the present disclosure. As shown in FIG. 5, example 500 includes a first wireless node 505, a second wireless node 510, and a third wireless node 515.

As further shown in FIG. 5, and by reference number 520, the first wireless node 505 may determine a slot format. For example, a DU may determine a slot format for one or more cells of the DU. Additionally, or alternatively, a CU may determine a slot format for one or more neighbor cells of the CU (e.g., one or more cells of a DU of a CU that neighbors the CU). In some aspects, the first wireless node 505 may determine the slot format based at least in part on a network traffic characteristic. For example, the first wireless node 505 may schedule one or more symbols as uplink symbols, downlink symbols, and/or flexible symbols, among other examples, based at least in part on a level of network traffic for an uplink or a downlink in a cell of first wireless node 505.

As further shown in FIG. 5, and by reference number 525, the first wireless node 505 may transmit a CLI management configuration message identifying a slot format. For example, the first wireless node 505 may transmit, to the second wireless node 510, an intended TDD DL-UL configuration message including one or more IEs to identify a slot format. In some aspects, the first wireless node 505 may include a permutation indicator in the CLI management configuration message. For example, the first wireless node 505 may transmit an intended TDD DL-UL configuration message with an information element (IE) that identifies whether a slot format is a downlink-flexible-uplink (DFU) slot format (e.g., a slot format with symbols assigned, in order, as, for example, [D, . . . , D, F, . . . , F, U, . . . . U], where a quantity, $N_1$, $N_2$, and $N_3$ of symbols assigned as D, F, and U, respectively, are each greater than or equal to 0). In other words, the IE may indicate a first quantity of downlink symbols, followed by a second quantity of flexible symbols, followed by a third quantity of uplink symbols. Additionally, or alternatively, the IE may include information identifying an uplink-flexible-downlink (UFD) slot format (e.g., a slot format with symbols assigned, in order, as, for example, [U, . . . , U, F, . . . , F, D, . . . . D]). Additionally, or alternatively, the IE may include information identifying another type of slot format.

In some aspects, the IE may be a bit indicator. For example, the first wireless node 505 may include one or more bits set to a particular value to identify a type of slot format. In this way, the second wireless node 510 may use the one or more bits to identify the type of slot format and one or more other IEs of the TDD DL-UL configuration message to determine a slot format of the identified type of slot format (e.g., values for $N_1$, $N_2$, and $N_3$). For example, the first wireless node 505 may include a first IE identifying a quantity of downlink symbols, a second IE identifying a quantity of uplink symbols, and a third IE identifying a slot format type. Based at least in part on the three IEs, the second wireless node 510 may infer (e.g., determine) a quantity of flexible symbols and determine an order of the uplink, downlink, and flexible symbols. Additionally, or alternatively, the first wireless node 505 may include one or more IEs identifying other types of symbol assignments, such as a full-duplex or a bidirectional symbol assignment.

In some aspects, the first wireless node 505 may include information identifying an availability of one or more resources. For example, when the first wireless node 505 is a CU and the second wireless node 510 is a DU, the first wireless node 505 may indicate whether one or more resources are available or not available based at least in part on a presence of another DU in a neighbor cell for which the first wireless node 505 is providing an intended TDD DL-UL configuration. In this case, the second wireless node 510 may identify one or more resources that are not available for communication based at least in part on the intended TDD DL-UL configuration indicating whether the one or more resources are hard-assigned, soft-assigned, or not-available-assigned. In some cases, the first wireless node 505 may group hard-assigned resources and soft-assigned resources into a single 'available' category and include an IE identifying whether one or more resources are 'available' (e.g., hard-assigned or soft-assigned) or 'not available' (e.g., not-available-assigned). In some aspects, the first wireless node 505 may identify a symbol assignment (e.g., downlink, and/or uplink flexible) of not available resources and/or of available resources.

In some aspects, the first wireless node 505 may include per-TRP configuration information in the CLI management configuration message. For example, when a plurality of TRPs are deployed in the same cell with different configurations, the first wireless node 505 may include a plurality of intended TDD DL-UL configurations and associated IEs for the plurality of TRPs. In this case, the first wireless node 505 may include a different identifier to identify each TRP of the plurality of TRPs. For example, the first wireless node 505 may include a physical cell identifier, a TRP identifier, a beam direction identifier, and/or a beam identifier, among other examples, and the second wireless node 510 may use included identifiers to determine which TRP is associated with which intended TDD DL-UL configuration and associated IEs.

As further shown in FIG. 5, and by reference number 530, the first wireless node 505 and/or the second wireless node 510 may communicate with one or more third wireless nodes 515 in accordance with an identified slot format. For example, the first wireless node 505 may communicate with a first UE 120 using the identified slot format, and the second wireless node 510 may communicate with a second UE 120 using a different slot format selected to avoid CLI with communications between the first wireless node 505 and the first UE 120.

As indicated above, FIG. 5 is provided as an example. Other examples may differ from what is described with respect to FIG. 5.

Figure 6:
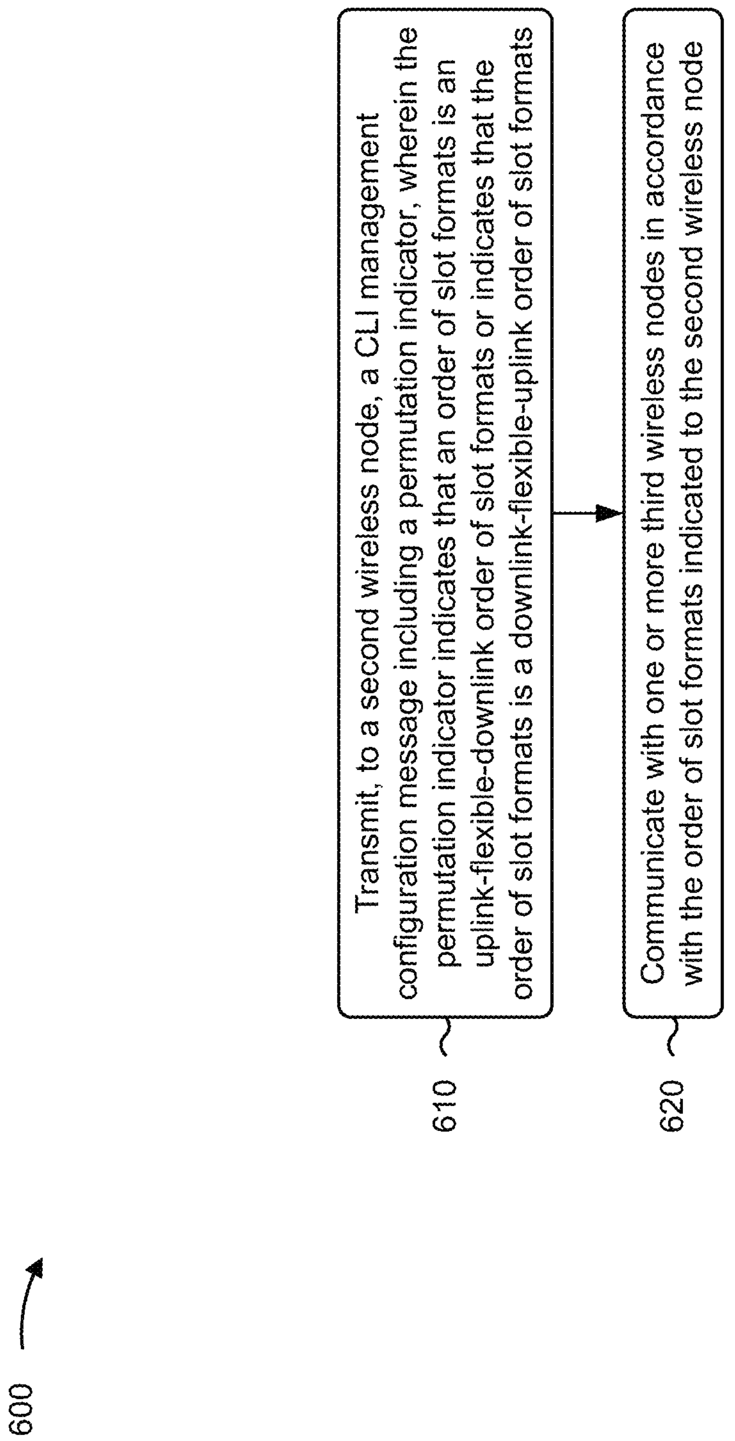
FIG. 6 is a diagram illustrating an example process performed, for example, by a first wireless node, in accordance with the present disclosure.

FIG. 6 is a diagram illustrating an example process 600 performed, for example, by a first wireless node, in accordance with the present disclosure. Example process 600 is an example where the first wireless node (e.g., UE 120, BS 110, and/or first wireless node 505) performs operations associated with TDD downlink-uplink configuration signaling.

As shown in FIG. 6, in some aspects, process 600 may include transmitting, to a second wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats (block 610). For example, the first wireless node (e.g., using controller/processor 240, transmit processor 220, TX MIMO processor 230, MOD 232, antenna 234, controller/processor 280, transmit processor 264, TX MIMO processor 266, MOD 254, and/or antenna 252) may transmit, to a second wireless node, a CLI management configuration message including a permutation indicator, as described above. In some aspects, the permutation indicator indicates that an order of slot formats is an uplink-flexible-downlink order of slot formats or indicates that the order of slot formats is a downlink-flexible-uplink order of slot formats.

As further shown in FIG. 6, in some aspects, process 600 may include communicating with one or more third wireless nodes in accordance with the order of slot formats indicated to the second wireless node (block 620). For example, the first wireless node (e.g., using controller/processor 240, transmit processor 220, TX MIMO processor 230, MOD 232, antenna 234, controller/processor 280, transmit processor 264, TX MIMO processor 266, MOD 254, antenna 252, DEMOD 232, MIMO detector 236, receive processor 238, DEMOD 254, MIMO detector 256, and/or receive processor 258) may communicate with one or more third wireless nodes in accordance with the order of slot formats indicated to the second wireless node, as described above.

Process 600 may include additional aspects, such as any single aspect or any combination of aspects described below and/or in connection with one or more other processes described elsewhere herein.

In a first aspect, the CLI management configuration message includes an availability indicator corresponding to one or more resources identified in the CLI management configuration message, where the availability indicator indicates that the one or more resources are available or not available.

In a second aspect, alone or in combination with the first aspect, a hard allocated resource or a soft allocated resource, of the one or more resources, is assigned an available value for the availability indicator.

In a third aspect, alone or in combination with one or more of the first and second aspects, the CLI management configuration message indicates, for a resource, of the one or more resources, associated with a not available value for the availability indicator, whether the resource is assigned as a downlink resource, an uplink resource, or a flexibly assigned resource.

In a fourth aspect, alone or in combination with one or more of the first through third aspects, the CLI management configuration message includes an indicator for a full-duplex or includes a bidirectional symbol slot format.

In a fifth aspect, alone or in combination with one or more of the first through fourth aspects, the CLI management configuration message includes a plurality of per-transmit receive point (TRP) configurations associated with a plurality of TRP identifiers or beam direction identifiers.

In a sixth aspect, alone or in combination with one or more of the first through fifth aspects, the CLI management configuration message is at least one of: an intended time division duplexing downlink-uplink configuration message, a configuration update message, an F1-AP interface message, or an Xn interface message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
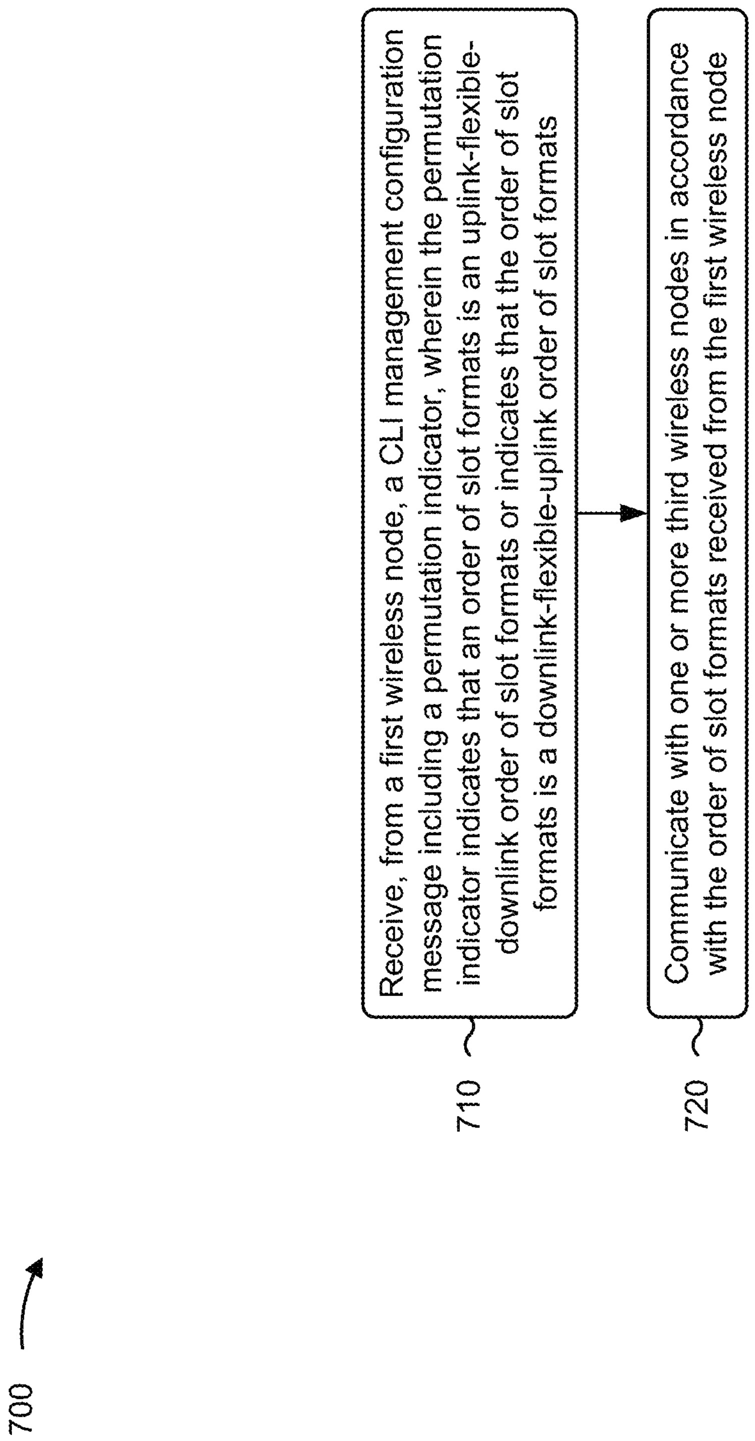
FIG. 7 is a diagram illustrating an example process performed, for example, by a second wireless node, in accordance with the present disclosure.

FIG. 7 is a diagram illustrating an example process 700 performed, for example, by a second wireless node, in accordance with the present disclosure. Example process 700 is an example where the second wireless node (e.g., BS 110, UE 120, and/or second wireless node 510) performs operations associated with TDD downlink-uplink configuration signaling.

As shown in FIG. 7, in some aspects, process 700 may include receiving, from a first wireless node, a CLI management configuration message including a permutation indicator, wherein the permutation indicator indicates that an order of slot formats is an uplink-flexible-downlink order of slot formats or indicates that the order of slot formats is a downlink-flexible-uplink order of slot formats (block 710). For example, the second wireless node (e.g., using antenna 234, DEMOD 232, MIMO detector 236, receive processor 238, controller/processor 240, antenna 252, DEMOD 254, MIMO detector 256, receive processor 258, and/or controller/processor 280) may receive, from a first wireless node, a CLI management configuration message including a permutation indicator, as described above. In some aspects, the permutation indicator indicates that an order of slot formats is an uplink-flexible-downlink order of slot formats or indicates that the order of slot formats is a downlink-flexible-uplink order of slot formats.

As further shown in FIG. 7, in some aspects, process 700 may include communicating with one or more third wireless nodes in accordance with the order of slot formats received from the first wireless node (block 720). For example, the second wireless node (e.g., using controller/processor 240, transmit processor 220, TX MIMO processor 230, MOD 232, antenna 234, controller/processor 280, transmit processor 264, TX MIMO processor 266, MOD 254, antenna 252, DEMOD 232, MIMO detector 236, receive processor 238, DEMOD 254, MIMO detector 256, and/or receive processor 258) may communicate with one or more third wireless nodes in accordance with the order of slot formats received from the first wireless node, as described above.

Process 700 may include additional aspects, such as any single aspect or any combination of aspects described below and/or in connection with one or more other processes described elsewhere herein.

In a first aspect, the CLI management configuration message includes an availability indicator corresponding to one or more resources identified in the CLI management configuration message, where the availability indicator indicates that the one or more resources are available or not available.

In a second aspect, alone or in combination with the first aspect, a hard allocated resource or a soft allocated resource, of the one or more resources, is assigned an available value for the availability indicator.

In a third aspect, alone or in combination with one or more of the first and second aspects, the CLI management configuration message indicates, for a resource, of the one or more resources, associated with a not available value for the availability indicator, whether the resource is assigned as a downlink resource, an uplink resource, or a flexibly assigned resource.

In a fourth aspect, alone or in combination with one or more of the first through third aspects, the CLI management configuration message includes an indicator for a full-duplex or includes a bidirectional symbol slot format.

In a fifth aspect, alone or in combination with one or more of the first through fourth aspects, the CLI management configuration message includes a plurality of per-TRP configurations associated with a plurality of TRP identifiers or beam direction identifiers.

In a sixth aspect, alone or in combination with one or more of the first through fifth aspects, the CLI management configuration message is at least one of: an intended time division duplexing downlink-uplink configuration message, a configuration update message, an F1-AP interface message, or an Xn interface message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a first wireless node, comprising: transmitting, to a second wireless node, a cross-link interference (CLI) management configuration message including a permutation indicator, wherein the permutation indicator indicates that an order of slot formats is an uplink-flexible-downlink order of slot formats or indicates that the order of slot formats is a downlink-flexible-uplink order of slot formats; and communicating with one or more third wireless nodes in accordance with the order of slot formats indicated to the second wireless node.

Aspect 2: The method of Aspect 1, wherein the CLI management configuration message includes an availability indicator corresponding to one or more resources identified in the CLI management configuration message, wherein the availability indicator indicates that the one or more resources are available or not available.

Aspect 3: The method of Aspect 2, wherein a hard allocated resource or a soft allocated resource, of the one or more resources, is assigned an available value for the availability indicator.

Aspect 4: The method of any of Aspects 2-3, wherein the CLI management configuration message indicates, for a resource, of the one or more resources, associated with a not available value for the availability indicator, whether the resource is assigned as a downlink resource, an uplink resource, or a flexibly assigned resource.

Aspect 5: The method of any of Aspects 1-4, wherein the CLI management configuration message includes an indicator for a full-duplex or includes a bidirectional symbol slot format.

Aspect 6: The method of any of Aspects 1-5, wherein the CLI management configuration message includes a plurality of per-transmit receive point (TRP) configurations associated with a plurality of TRP identifiers or beam direction identifiers.

Aspect 7: The method of any of Aspects 1-6, wherein the CLI management configuration message is at least one of: an intended time division duplexing (TDD) downlink-uplink (DL-UL) configuration message, a configuration update message, an F1-AP interface message, or an Xn interface message.

Aspect 8: A method of wireless communication performed by a second wireless node, comprising: receiving, from a first wireless node, a cross-link interference (CLI) management configuration message including a permutation indicator, wherein the permutation indicator indicates that an order of slot formats is an uplink-flexible-downlink order of slot formats or indicates that the order of slot formats is a downlink-flexible-uplink order of slot formats; and communicating with one or more third wireless nodes in accordance with the order of slot formats received from the first wireless node.

Aspect 9: The method of Aspect 8, wherein the CLI management configuration message includes an availability indicator corresponding to one or more resources identified in the CLI management configuration message, wherein the availability indicator indicates that the one or more resources are available or not available.

Aspect 10: The method of Aspect 9, wherein a hard allocated resource or a soft allocated resource, of the one or more resources, is assigned an available value for the availability indicator.

Aspect 11: The method of any of Aspects 9-10, wherein the CLI management configuration message indicates, for a resource, of the one or more resources, associated with a not available value for the availability indicator, whether the resource is assigned as a downlink resource, an uplink resource, or a flexibly assigned resource.

Aspect 12: The method of any of Aspects 8-11, wherein the CLI management configuration message includes an indicator for a full-duplex or includes a bidirectional symbol slot format.

Aspect 13: The method of any of Aspects 8-12, wherein the CLI management configuration message includes a plurality of per-transmit receive point (TRP) configurations associated with a plurality of TRP identifiers or beam direction identifiers.

Aspect 14: The method of any of Aspects 8-13, wherein the CLI management configuration message is at least one of: an intended time division duplexing (TDD) downlink-uplink (DL-UL) configuration message, a configuration update message, an F1-AP interface message, or an Xn interface message.

Aspect 15: An apparatus for wireless communication at a device, comprising a processor; memory coupled with the processor; and instructions stored in the memory and executable by the processor to cause the apparatus to perform the method of one or more Aspects of Aspects 1-7.

Aspect 16: A device for wireless communication, comprising a memory and one or more processors coupled to the memory, the memory and the one or more processors configured to perform the method of one or more Aspects of Aspects 1-7.

Aspect 17: An apparatus for wireless communication, comprising at least one means for performing the method of one or more Aspects of Aspects 1-7.

Aspect 18: A non-transitory computer-readable medium storing code for wireless communication, the code comprising instructions executable by a processor to perform the method of one or more Aspects of Aspects 1-7.

Aspect 19: A non-transitory computer-readable medium storing a set of instructions for wireless communication, the set of instructions comprising one or more instructions that, when executed by one or more processors of a device, cause the device to perform the method of one or more Aspects of Aspects 1-7.

Aspect 20: An apparatus for wireless communication at a device, comprising a processor; memory coupled with the processor; and instructions stored in the memory and executable by the processor to cause the apparatus to perform the method of one or more Aspects of Aspects 8-14.

Aspect 21: A device for wireless communication, comprising a memory and one or more processors coupled to the memory, the memory and the one or more processors configured to perform the method of one or more Aspects of Aspects 8-14.

Aspect 22: An apparatus for wireless communication, comprising at least one means for performing the method of one or more Aspects of Aspects 8-14.

Aspect 23: A non-transitory computer-readable medium storing code for wireless communication, the code comprising instructions executable by a processor to perform the method of one or more Aspects of Aspects 8-14.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 8-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A first wireless node for wireless communication, comprising:
a memory; and
one or more processors, coupled to the memory, configured to cause the first wireless node to:
transmit, to a second wireless node and in an F1 setup message or a configuration update message, an intended time division duplexing (TDD) downlink-uplink (DL-UL) configuration of one or more cells of the first wireless node, wherein:
the intended TDD DL-UL configuration identifies a slot format for a slot,
the first wireless node is a distributed unit, and
the second wireless node is a central unit; and
communicate with one or more third wireless nodes in the slot in accordance with the slot format indicated to the second wireless node.

2. The first wireless node of claim 1,
wherein the intended TDD DL-UL configuration is associated with cross-link interference management.

3. The first wireless node of claim 1,
wherein the intended TDD DL-UL configuration includes:
a first information element (IE) identifying a first quantity of downlink symbols in the slot,
a second IE identifying a second quantity of uplink symbols in the slot, and
a third IE identifying the slot format for the slot.

4. The first wireless node of claim 1,
wherein the intended TDD DL-UL configuration includes a permutation indicator for the slot, wherein the permutation indicator indicates that the slot format is an uplink-flexible-downlink slot format or indicates that slot format is a downlink-flexible-uplink slot format.

5. The first wireless node of claim 1,
wherein the configuration update message is a distributed unit configuration update message.

6. The first wireless node of claim 1,
wherein the one or more third wireless nodes comprise a user equipment (UE).

7. The first wireless node of claim 1,
wherein the slot format is selected for cross-link interference management.

8. A first wireless node for wireless communication, comprising:
a memory; and
one or more processors, coupled to the memory, configured to cause the first wireless node to:
receive, from a second wireless node and in an F1 setup message or a configuration update message, an intended time division duplexing (TDD) downlink-uplink (DL-UL) configuration of one or more cells of the second wireless node, wherein:
the intended TDD DL-UL configuration identifies a slot format for a slot,
the first wireless node is a central unit, and
the second wireless node is a distributed unit; and
communicate with one or more third wireless nodes in the slot in accordance with the slot format indicated by the second wireless node.

9. The first wireless node of claim 8,
wherein the intended TDD DL-UL configuration is associated with cross-link interference management.

10. The first wireless node of claim 8,
wherein the intended TDD DL-UL configuration includes:
a first information element (IE) identifying a first quantity of downlink symbols in the slot,
a second IE identifying a second quantity of uplink symbols in the slot, and
a third IE identifying the slot format for the slot.

11. The first wireless node of claim 8,
wherein the intended TDD DL-UL configuration includes a permutation indicator for the slot, wherein the permutation indicator indicates that the slot format is an uplink-flexible-downlink slot format or indicates that slot format is a downlink-flexible-uplink slot format.

12. The first wireless node of claim 8,
wherein the configuration update message is a distributed unit configuration update message.

13. The first wireless node of claim 8,
wherein the one or more third wireless nodes comprise a user equipment (UE).

14. The first wireless node of claim 8,
wherein the slot format is selected for cross-link interference management.

15. A method of wireless communication performed by a first wireless node, comprising:
transmitting, to a second wireless node and in an F1 setup message or a configuration update message, an intended time division duplexing (TDD) downlink-uplink (DL-UL) configuration of one or more cells of the first wireless node, wherein:
the intended TDD DL-UL configuration identifies a slot format for a slot,
the first wireless node is a distributed unit, and
the second wireless node is a central unit; and
communicating with one or more third wireless nodes in the slot in accordance with the slot format indicated to the second wireless node.

16. The method of claim 15,
wherein the intended TDD DL-UL configuration is associated with cross-link interference management.

17. The method of claim 15,
wherein the intended TDD DL-UL configuration includes:
a first information element (IE) identifying a first quantity of downlink symbols in the slot,
a second IE identifying a second quantity of uplink symbols in the slot, and
a third IE identifying the slot format for the slot.

18. The method of claim 15, wherein the intended TDD DL-UL configuration includes a permutation indicator for the slot, wherein the permutation indicator indicates that the slot format is an uplink-flexible-downlink slot format or indicates that slot format is a downlink-flexible-uplink slot format.

19. The method of claim 15, wherein the one or more third wireless nodes comprise a user equipment (UE).

20. The method of claim 15, wherein the slot format is selected for cross-link interference management.

* * * * *